United States Patent
Muldoon

(10) Patent No.: US 9,982,771 B2
(45) Date of Patent: May 29, 2018

(54) LIGHTWEIGHT AND COMPLIANT JOURNAL PIN

(71) Applicant: United Technologies Corporation, Hartford, CT (US)

(72) Inventor: Marc J. Muldoon, Marlborough, CT (US)

(73) Assignee: United Technologies Corporation, Farmington, CT (US)

( * ) Notice: Subject to any disclaimer, the term of this patent is extended or adjusted under 35 U.S.C. 154(b) by 196 days.

(21) Appl. No.: 14/853,208

(22) Filed: Sep. 14, 2015

(65) Prior Publication Data

US 2016/0201793 A1   Jul. 14, 2016

Related U.S. Application Data

(60) Provisional application No. 62/086,006, filed on Dec. 1, 2014.

(51) Int. Cl.
| | |
|---|---|
| *F16H 57/08* | (2006.01) |
| *F16C 17/02* | (2006.01) |
| *F16H 1/28* | (2006.01) |
| *F16H 57/04* | (2010.01) |
| *F02C 7/36* | (2006.01) |

(52) U.S. Cl.
CPC .............. *F16H 57/08* (2013.01); *F02C 7/36* (2013.01); *F16C 17/02* (2013.01); *F16H 1/28* (2013.01); *F16H 57/043* (2013.01); *F16H 57/0479* (2013.01); *F16H 57/0482* (2013.01);
(Continued)

(58) Field of Classification Search
CPC ...... F16H 1/28; F16H 57/043; F16H 57/0431; F16H 57/0482; F16H 57/08; F16H 2260/40311; F16H 2057/085; F16H 57/0467; F16H 57/0471; F16H 57/0469; F16H 57/0479; F02C 7/36; F05D 2260/40311
See application file for complete search history.

(56) References Cited

U.S. PATENT DOCUMENTS

| | | | | |
|---|---|---|---|---|
| 5,472,383 A | * | 12/1995 | McKibbin | ........... F16H 57/0482 184/6.12 |
| 2008/0116009 A1 | * | 5/2008 | Sheridan | ................. F01D 25/18 184/6.4 |

(Continued)

FOREIGN PATENT DOCUMENTS

| | | |
|---|---|---|
| EP | 2264336 | 12/2010 |
| EP | 2554874 | 2/2013 |

OTHER PUBLICATIONS

Extended European Search Report dated Apr. 8, 2016 in European Application No. 15197318.7.

*Primary Examiner* — Robert W Hodge
*Assistant Examiner* — Lori Wu
(74) *Attorney, Agent, or Firm* — Snell & Wilmer L.L.P.

(57) ABSTRACT

An epicyclic gear system is provided. The gear system may comprise an annular gear centered about an axis, a star gear radially inward from the annular gear, a journal pin inside the star gear and comprising an internal bore with a recessed wall, and a sun gear radially inward from the star gear. A journal pin is also provided. The journal pin may include an internal bore formed along an axis of rotation of the journal pin, and a recessed wall of the internal bore with a diameter greater than the diameter of the internal bore.

6 Claims, 3 Drawing Sheets

(52) U.S. Cl.
CPC .............. *F05D 2260/40311* (2013.01); *F16H 2057/085* (2013.01); *Y02T 50/671* (2013.01)

(56) References Cited

U.S. PATENT DOCUMENTS

| | | | |
|---|---|---|---|
| 2013/0184120 A1* | 7/2013 | Altamura | F16H 1/28 475/346 |
| 2014/0287864 A1* | 9/2014 | Iizuka | F16H 57/043 475/159 |
| 2015/0252889 A1* | 9/2015 | Feraud | F16H 57/0442 475/159 |

* cited by examiner

LIGHTWEIGHT AND COMPLIANT JOURNAL PIN

CROSS-REFERENCE TO RELATED APPLICATIONS

This application is a nonprovisional of, and claims priority to, and the benefit of U.S. Provisional Application No. 62/086,006, entitled "LIGHTWEIGHT AND COMPLIANT JOURNAL PIN," filed on Dec. 1, 2014, which is hereby incorporated by reference in its entirety.

FIELD OF INVENTION

The present disclosure relates to gas turbine engines, and, more specifically, to a compliant and lightweight journal pin.

BACKGROUND

Gears in an epicyclic gear box may rotate on journal bearings. Epicyclic gear systems placed under load may deflect and diminish the performance of gears and bearings. Rigid gear systems may not allow for deflection and thus may suffer reduced performance. At the same time, the journal bearing must be stiff enough to withstand stress in high-torque applications such as gas turbine engines. Additionally, weight in aircraft applications may also be a concern with heavy gear boxes. In that regard, improving weight, compliance, and/or stiffness characteristics of a journal pin may be a tradeoff.

SUMMARY

An epicyclic gear system is provided. The gear system may comprise an annular gear centered about an axis, a star gear radially inward from the annular gear, a journal pin inside the star gear and comprising an internal bore with a recessed wall, and a sun gear radially inward from the star gear.

In various embodiments, a collar may be welded to the journal pin. The collar may comprise a recessed wall. A carrier may be press fit onto the collar. The carrier may be fixed, and the sun gear and annular gear may be configured to rotate about the axis. The internal bore and the recessed wall may also be configured to act as an oil plenum. The pin may define a passage configured to deliver oil from the oil plenum to a thin oil film between the sun gear and the journal pin. The recessed wall may have a radial shape. The journal pin may further comprise an undercut.

A journal pin is also provided. The journal pin may include an internal bore formed along an axis of rotation of the journal pin, and a recessed wall of the internal bore with a diameter greater than the diameter of the internal bore.

In various embodiments, an undercut may be radially outward from the internal bore and radially inward from an outer diameter of the journal pin. The recessed wall may comprise a radial or multi-radial shape. A passage may extend from the internal bore and/or the recessed wall to an outer diameter of the journal pin. A collar may be welded to the journal pin. The collar may comprise a recessed wall.

A journal bearing is also provided and comprises a journal housing and a journal pin inside the journal housing. The journal pin includes an inner diameter with a recessed wall.

In various embodiments, the journal pin comprises an undercut radially outward from the inner bore and radially inward from an outer diameter of the journal pin. A collar may be configured to retain the journal pin within the journal housing. The collar may comprise a recessed wall. The collar may be welded to the journal pin.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "distal" refers to the direction radially outward, or generally, away from the axis of rotation of a gear around a journal pin. As used herein, "proximal" refers to a direction radially inward, or generally, towards the axis of rotation of a gear around a journal pin.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
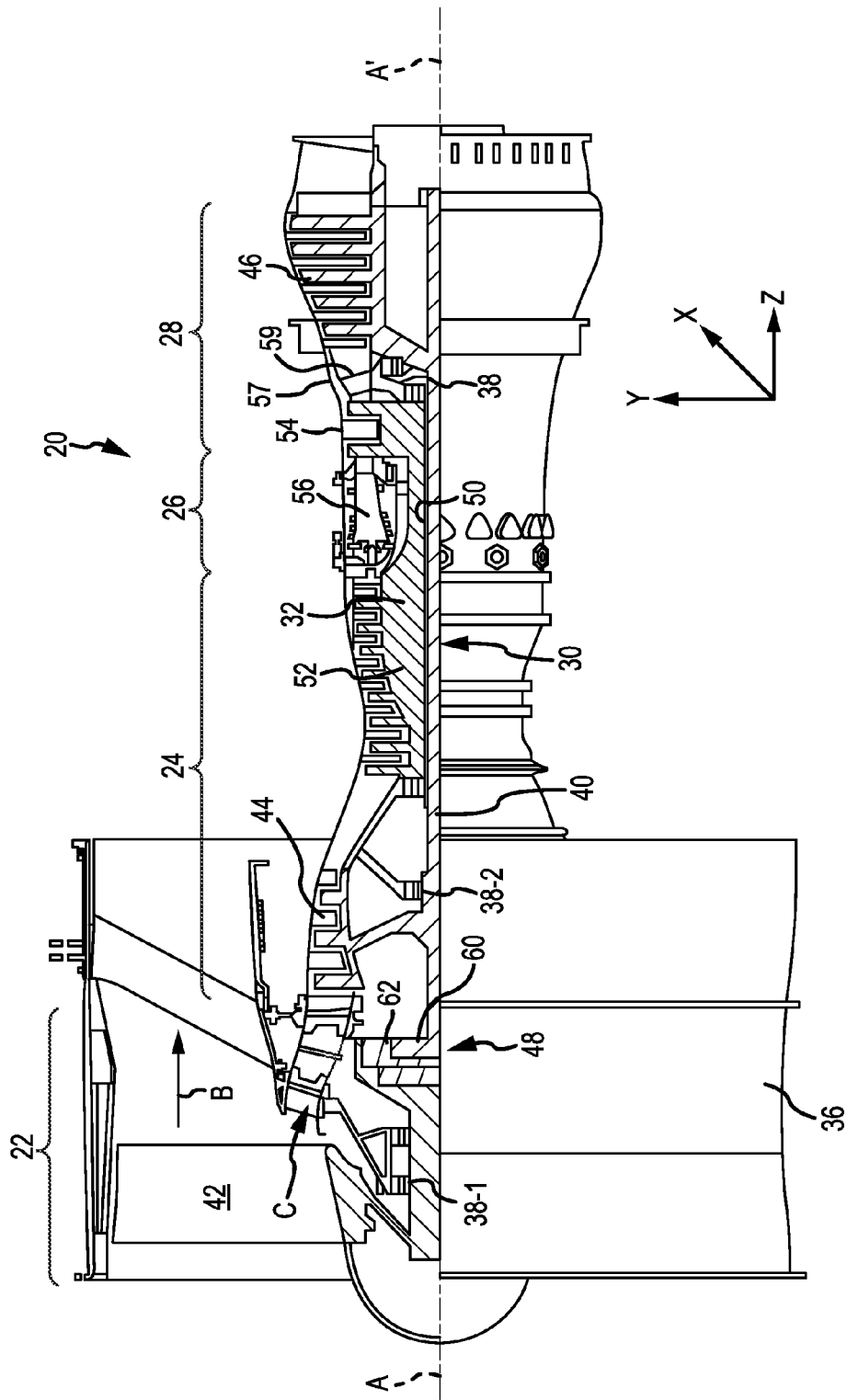
FIG. 1 is cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmenter section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor 52 and high pressure (or second) turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
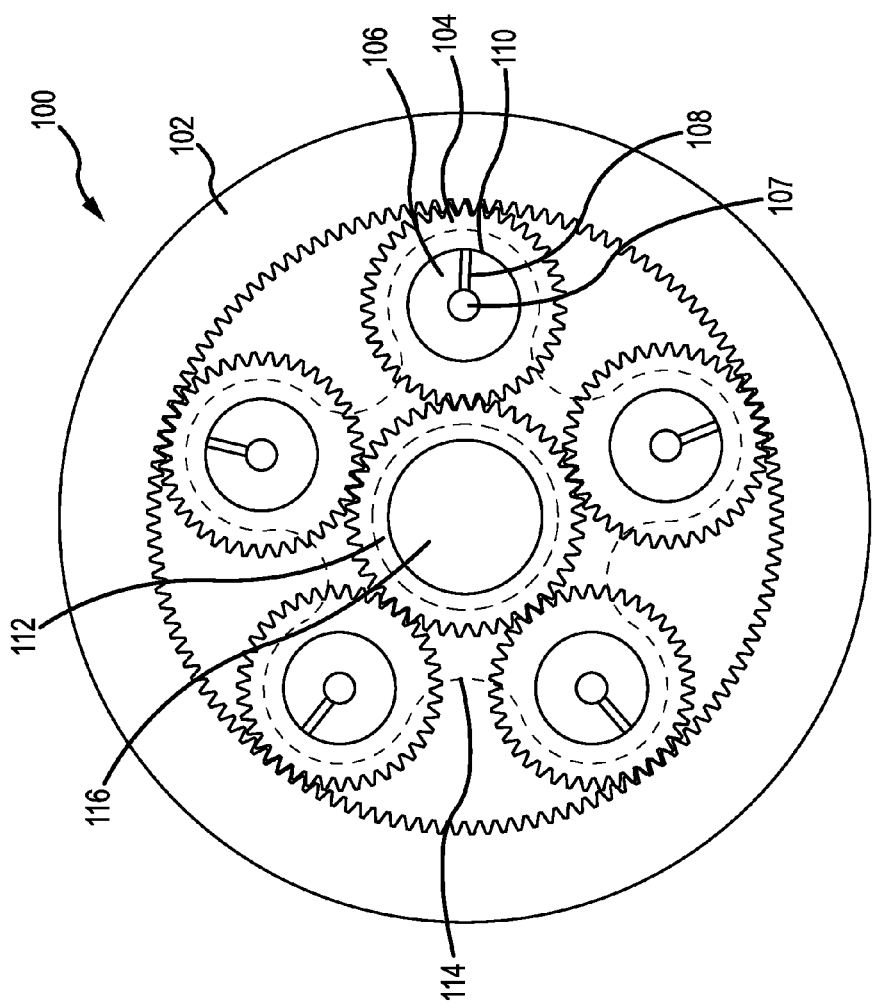
FIG. 2 illustrates an exemplary epicyclic gear box, in accordance with various embodiments.

With reference to FIG. 2, an epicyclic gear system 100, which is geared architecture 48 of FIG. 1, is shown. The epicyclic gear system 100 comprises an annular gear 102. Annular gear 102 has teeth facing radially inward to interface with star gears 104. Star gears 104 may be disposed radially inward from annular gear 102 and may comprise teeth around an outer diameter of star gears 104. Star gears 104 may comprise a journal pin 106 central to star gears 104. In that regard, star gear 104 may be a journal housing that forms a journal bearing star gear 104 rotating relative to journal pin 106. Oil may be delivered through internal bore 107 of journal pin 106. The oil may pass through passage 108 to form a thin oil film 110 between journal pin 106 and star gear 104, generally following the circumference of journal pin 106. Star gear 104 may rotate about journal pin 106 with a thin oil film 110 filling a space between journal pin 106 and star gear 104 to provide lubrication.

In various embodiments, star gears 104 may be coupled to carrier 114. Carrier 114 is ghosted in FIG. 2 to provide greater detail of features behind carrier 114. A sun gear 112 may be central to epicyclic gear system 100. Sun gear 112 may be fixed to shaft 116 extending axially from the center of annular gear 102 and the center of sun gear 112.

In various embodiments, journal pin 106 may be fixed in place relative to a reference point outside the epicyclic gear system (such as an engine) by carrier 114, and both sun gear 112 and annular gear 102 may rotate. In that regard, shaft 116 and annular gear 102 may provide an input and output to epicyclic gear system 100. In various embodiments, star gears 104 may also move about sun gear 112 (star gear 104 may be referred to as a planet gear in this configuration) and either annular gear 102 or sun gear 112 may be fixed in place. In that regard, carrier 114 and the unfixed gear of sun gear 112 and annular gear 102 may provide an input and output to epicyclic gear system 100.

Figure 3:
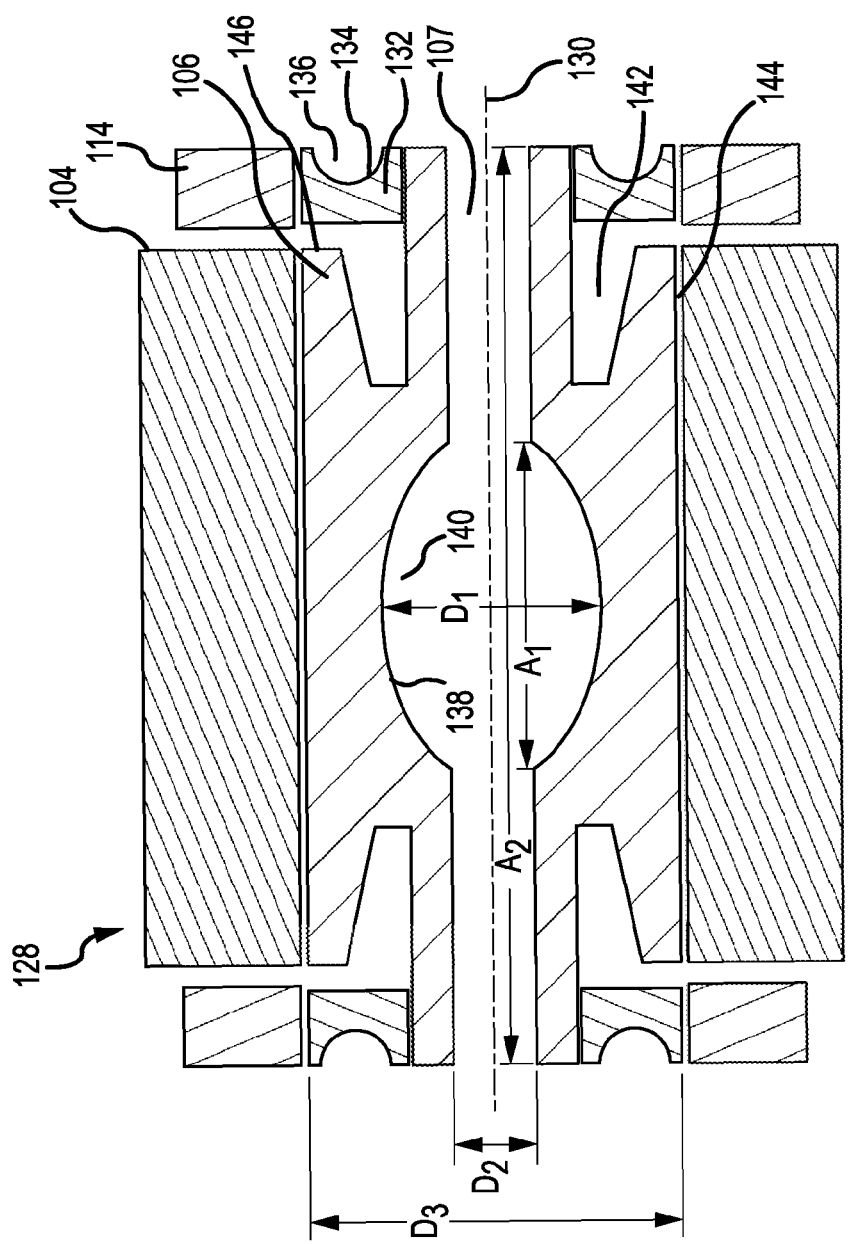
FIG. 3 illustrates a journal bearing comprising a compliant journal pin and collar, in accordance with various embodiments.

FIG. 3 illustrates star gear assembly 128 (as illustrated in FIG. 2) having a journal pin 106 and collar 132 with improved compliance, in accordance with various embodiments. Journal pin 106 may be symmetric about axis of rotation 130. Journal pin 106 is radially inward from star gear 104. Thin oil film 144 between star gear 104 and journal pin 106 provides lubrication for star gear 104 to rotate about journal pin 106. Journal pin 106 has internal bore 107 passing through journal pin 106 along axis of rotation 130. Journal pin 106 has recessed wall 138 of internal bore 107 with recessed wall 138 having a diameter D1 greater than the diameter D2 at the opening of internal bore 107. Internal bore 107 and recessed wall 138 may define a volume 140 that functions as an oil plenum to deliver oil to thin oil film 144 through passage 108 (with reference to FIG. 2) to an annular volume between the inner diameter of star gear 104 and the outer diameter of journal pin 106.

In various embodiments, the recessed wall may be radial, multi-radial, rectangular, elliptical, linear, or other shape to reduce weight and provide increased compliance in response to stress between star gear 104 and journal pin 106. Recessed wall 138 of journal pin 106 may have a diameter D1 approximately 50% or less of the length of the outer diameter D3 of journal pin 106 or less. For example, the outer diameter D3 of journal pin 106 may be 3.7 inches (9.4 cm) and the diameter of recessed wall D1 may be 1.9 inches (4.8 cm). Recessed wall may have an axial length A1 that is 45% of the axial length A2 of journal pin 106 or less. For example, journal pin may have an axial length A2 of 4.4 inches (11.2 cm) while the recessed wall has an axial length A1 of 1.8 inches (4.6 cm). Journal pin 106 may include undercut 142 to increase compliance. Undercut 142 may be radially inward from an outer diameter of journal pin 106 and radially outward from internal bore of journal pin 106. Undercut 142 may be defined by wings 146 of journal pin 106 overhanging a portion of internal bore 107.

In various embodiments, collar 132 extends around journal pin 106. Collar 132 may be welded to journal pin 106. Carrier 114 may be press fit onto collar 132 and thereby coupled to journal pin 106. Carrier 114 may also be coupled to a fixed point, such as a gearbox housing. In that regard, carrier 114 may fix journal pin 106 in place relative to the fixed point. Collar 132 may be configured to retain journal pin 106 within star gear 104 (functioning as a bearing housing). Collar 132 may include recessed wall 134 defining cutout 136. Cutout 136 may be radial, multi-radial, rectangular, elliptical, linear, or other shape to reduce weight and provide increased compliance. Star gear 104 applies torque to journal pin 106 while rotating about journal pin 106. The force may tend to twist or deflect journal pin 106. Recessed wall 138 of journal pin 106 may have a balance of moment stiffness to resist the force of star gear 104 and compliance to improve performance of epicyclic gear system 100. Adding compliance to the system allows for deflection with reduced impact on performance, especially if the flexibility of compliant design features is sufficiently less than the journal film or gear mesh stiffness.

In various embodiments, journal pin 106 may be made from metal materials such as steel. Internal bore 107 may be drilled through journal pin 106. Internal bore 107 may provide access for a machining tool to remove metal from internal bore 107 of journal pin 106 and create recessed wall 138. Journal pin 106 may also be additively manufactured or cast to form internal bore 107 and recessed wall 138.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An epicyclic gear system, comprising:
   an annular gear centered about an axis;
   a star gear radially inward from the annular gear;
   a journal pin inside the star gear and comprising an internal bore with a recessed wall, the internal bore extending completely through the journal pin;
   a collar coupled to the journal pin, wherein the collar comprises a second recessed wall;
   a carrier press fit onto the collar; and
   a sun gear radially inward from the star gear.

2. The epicyclic gear system of claim 1, wherein the carrier is fixed and the sun gear and the annular gear are configured to rotate about the axis.

3. The epicyclic gear system of claim 1, wherein the internal bore and the recessed wall of the internal bore are configured to act as an oil plenum.

4. The epicyclic gear system of claim 3, further comprising a passage defined by the journal pin, the passage configured to deliver oil from the oil plenum to a thin oil film between the star gear and the journal pin.

5. The epicyclic gear system of claim 1, wherein the recessed wall has a radial shape.

6. The epicyclic gear system of claim 1, wherein the journal pin further comprises an undercut.

* * * * *